(12) United States Patent
Suzuki

(10) Patent No.: US 8,166,531 B2
(45) Date of Patent: Apr. 24, 2012

(54) DEVICE REGISTRATION SYSTEM, DEVICE REGISTRATION SERVER, DEVICE REGISTRATION METHOD, DEVICE REGISTRATION PROGRAM, STORAGE MEDIUM, AND TERMINAL DEVICE

(75) Inventor: Naoshi Suzuki, Chiba (JP)

(73) Assignee: Sony Corporation (JP)

( * ) Notice: Subject to any disclaimer, the term of this patent is extended or adjusted under 35 U.S.C. 154(b) by 1048 days.

(21) Appl. No.: 10/881,509

(22) Filed: Jun. 30, 2004

(65) Prior Publication Data
US 2005/0033994 A1     Feb. 10, 2005

(30) Foreign Application Priority Data
Jun. 30, 2003   (JP) ................. P2003-188142

(51) Int. Cl.
*G06F 21/00* (2006.01)
(52) U.S. Cl. ......... 726/9; 726/4; 726/7; 726/21; 726/28; 713/155; 713/168; 713/184; 713/185; 713/186; 713/193; 380/270; 380/279; 380/282
(58) Field of Classification Search .................. 726/21, 726/7, 9, 28, 4; 713/155, 168, 184, 185, 713/186, 193; 380/270, 279, 282
See application file for complete search history.

(56) References Cited

U.S. PATENT DOCUMENTS

| 5,401,950 | A  | * | 3/1995  | Yoshida ........................ 235/487 |
| 5,502,765 | A  | * | 3/1996  | Ishiguro et al. ................. 705/67 |
| 5,701,343 | A  | * | 12/1997 | Takashima et al. ............. 705/51 |
| 6,067,621 | A  | * | 5/2000  | Yu et al. ........................ 713/172 |
| 6,199,114 | B1 | * | 3/2001  | White et al. .................. 709/229 |
| 6,615,192 | B1 | * | 9/2003  | Tagawa et al. .................. 705/57 |
| 6,636,620 | B1 | * | 10/2003 | Hoshino ........................ 382/124 |
| 6,802,007 | B1 | * | 10/2004 | Canelones et al. ............ 713/193 |
| 6,880,751 | B2 | * | 4/2005  | Okamura et al. ............. 235/380 |

(Continued)

FOREIGN PATENT DOCUMENTS
EP            1 289 228 A2    3/2003
(Continued)

OTHER PUBLICATIONS

Office Action from Japanese Application No. 2008-237653, dated Jul. 5, 2011.

*Primary Examiner* — Edan Orgad
*Assistant Examiner* — Kari Schmidt
(74) *Attorney, Agent, or Firm* — Lerner, David, Littenberg, Krumholz & Mentlik, LLP

(57) ABSTRACT

In a device registration system, user authentication and device authentication of a CE device are executed in a single session, and the user and the CE device are associated with each other if these authentications succeed. The CE device obtains information for the user authentication from an IC card and a portable memory, and sends the information and device authentication information to a device registration unit. The device registration unit sends the information for the user authentication to a user authentication unit, and the device authentication information to a device authentication unit. The user authentication unit executes a user authentication process and sends information of the user to the device registration unit if the authentication succeeds. The device authentication unit executes a device authentication process and sends information of the device to the device registration unit if the authentication succeeds. The device registration unit associates the user information and the device information with each other.

13 Claims, 11 Drawing Sheets

U.S. PATENT DOCUMENTS

| | | | |
|---|---|---|---|
| 6,915,422 B1 * | 7/2005 | Nakamura | 713/155 |
| 6,954,765 B2 * | 10/2005 | Spiegel | 707/200 |
| 6,990,588 B1 * | 1/2006 | Yasukura | 713/186 |
| 7,188,360 B2 * | 3/2007 | Gerdes et al. | 726/4 |
| 7,240,216 B2 * | 7/2007 | Ishikawa et al. | 713/185 |
| 7,287,165 B2 * | 10/2007 | Aono et al. | 713/182 |
| 2002/0049677 A1 * | 4/2002 | Yamada et al. | 705/51 |
| 2002/0066042 A1 * | 5/2002 | Matsumoto et al. | 713/202 |
| 2003/0037264 A1 | 2/2003 | Ezaki et al. | |
| 2003/0149852 A1 * | 8/2003 | Kang | 711/164 |
| 2003/0172282 A1 * | 9/2003 | Jiang | 713/184 |
| 2003/0174839 A1 * | 9/2003 | Yamagata et al. | 380/270 |
| 2003/0231334 A1 * | 12/2003 | Nagai et al. | 358/1.14 |
| 2004/0152489 A1 * | 8/2004 | Kikuchi et al. | 455/559 |
| 2004/0242217 A1 * | 12/2004 | Blickberndt et al. | 455/418 |

FOREIGN PATENT DOCUMENTS

| | | |
|---|---|---|
| JP | 04-267463 A | 9/1992 |
| JP | 11-250012 A | 9/1999 |
| JP | 11282804 A | 10/1999 |
| JP | 2001-138670 A | 5/2001 |
| JP | 2001-273421 A | 10/2001 |
| JP | 2001-344205 A | 12/2001 |
| JP | 2002-024534 A | 1/2002 |
| JP | 2002-352059 A | 12/2002 |
| JP | 2003-016039 A | 1/2003 |
| JP | 2003-067563 A | 3/2003 |
| JP | 2005025337 A | 1/2005 |
| WO | WO-03/005671 A2 | 1/2003 |

* cited by examiner

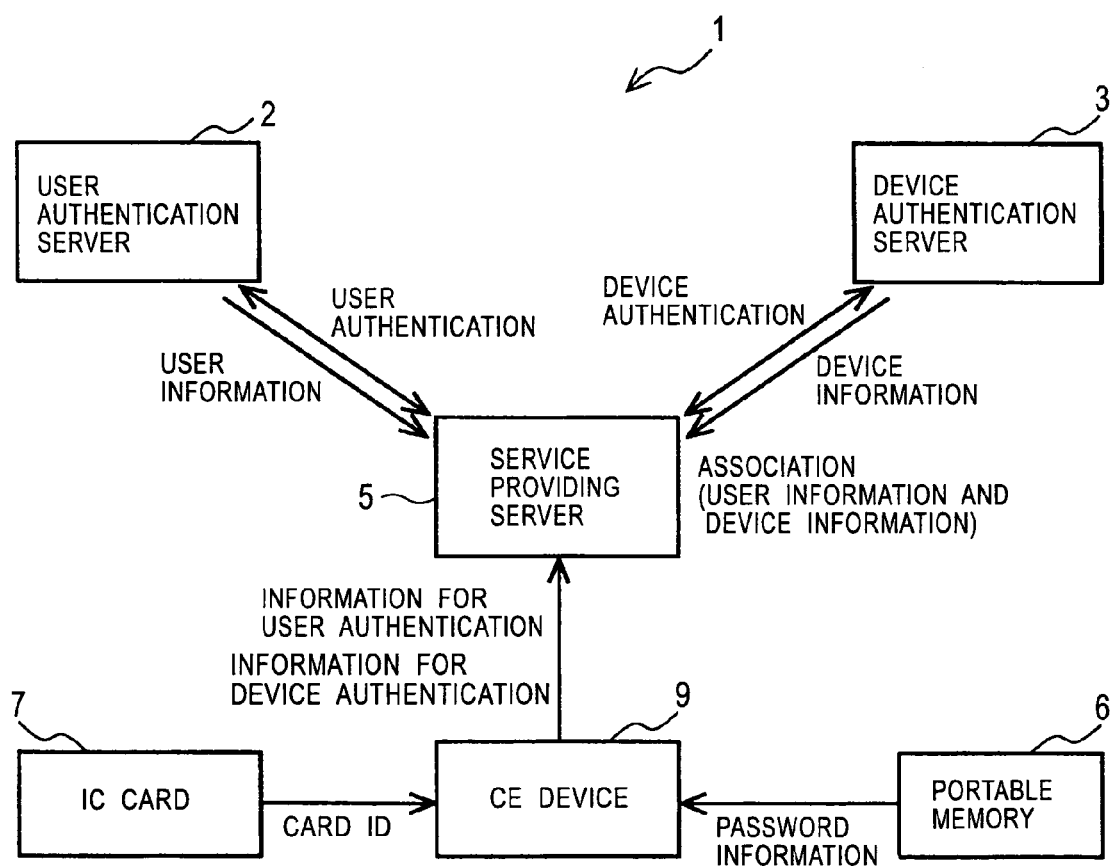

FIG. 2A

USER AUTHENTICATION TABLE

| CARD ID | USER ID | PASSWORD INFORMATION | USER INFORMATION |
|---|---|---|---|
| 1 2 3 4 5 6 | k e n c h a n | d e s k t o p | USER INFORMATION 1 |
| 2 3 4 5 6 7 | t a k a s a n | s c r e e n | USER INFORMATION 2 |
| ⋮ | ⋮ | ⋮ | ⋮ |

FIG. 2B

DEVICE AUTHENTICATION TABLE

| DEVICE ID | DEVICE AUTHENTICATION INFORMATION | DEVICE INFORMATION | REGISTRATION NUMBER |
|---|---|---|---|
| 5 6 7 8 9 1 0 | a b c d e f g | DEVICE INFORMATION 1 | 1 2 5 6 |
| 3 4 5 6 7 8 9 | h i j k l m n | DEVICE INFORMATION 2 | 1 3 3 2 |
| ⋮ | ⋮ | ⋮ | ⋮ |

FIG. 2C

DEVICE-USER ASSOCIATION TABLE

| USER INFORMATION | DEVICE INFORMATION |
|---|---|
| USER INFORMATION 1 | DEVICE INFORMATION 1 |
| | DEVICE INFORMATION 2 |
| | ⋮ |
| USER INFORMATION 2 | ⋮ |
| | ⋮ |

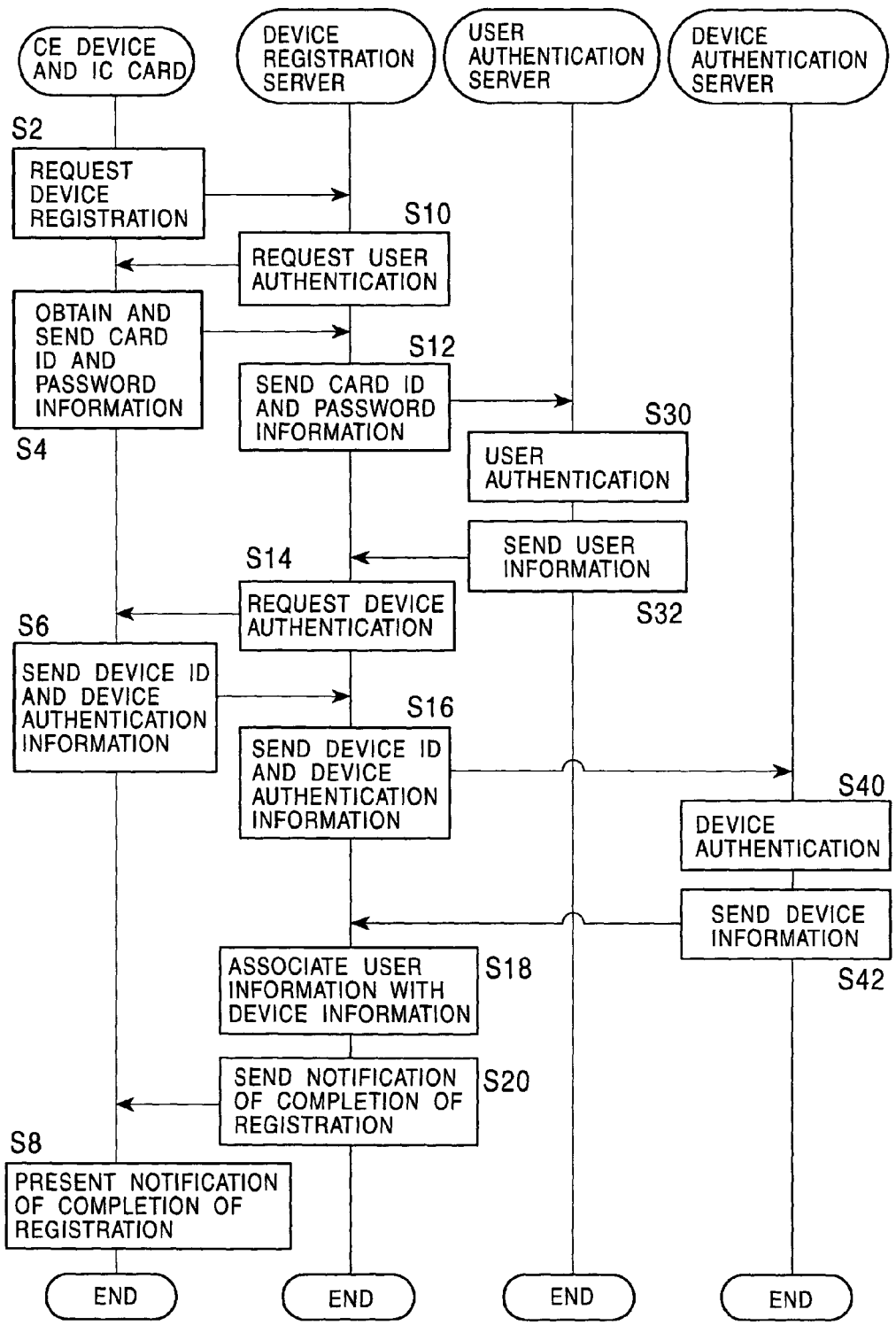

FIG. 4A

TO REGISTER THIS DEVICE,
PLEASE SET YOUR
IC CARD AND PORTABLE
MEMORY.

FIG. 4B

AUTHENTICATION
IN PROGRESS

FIG. 4C

THE DEVICE P55 WITH
SERIAL NUMBER ****
WILL BE REGISTERED
AS DEVICE OWNED
BY XX. OK?

YES    NO

FIG. 4D

REGISTRATION
COMPLETE

FIG. 6

USER AUTHENTICATION TABLE

| USER ID | DEVICE ID |
|---|---|
| kenchan | 5 6 7 8 9 1 0 |
|  | 3 4 5 6 7 8 9 |
|  | ⋮ |
| takasan | ⋮ |
| ⋮ | ⋮ |

FIG. 9A
USER AUTHENTICATION TABLE

| CARD ID | USER ID | PASSWORD | USER INFORMATION | PREPAYMENT INFORMATION |
|---------|---------|----------|------------------|------------------------|
| 123456 | kenchan | desktop | USER INFORMATION 1 | PREPAYMENT INFORMATION 1 |
| 234567 | takasan | screen | USER INFORMATION 2 | PREPAYMENT INFORMATION 2 |
| ⋮ | ⋮ | ⋮ | ⋮ | ⋮ |

FIG. 9B
PREPAYMENT INFORMATION DATABASE

| PREPAYMENT INFORMATION | LOG DATA |
|------------------------|----------|
| PREPAYMENT INFORMATION 1 | ⋮ |
| ⋮ | ⋮ |

FIG. 9C
SERVICE USER TABLE

| USER INFORMATION | PREPAYMENT INFORMATION | DEVICE INFORMATION | REGISTERED SERVICE |
|------------------|------------------------|--------------------|--------------------|
| USER INFORMATION 1 | PREPAYMENT INFORMATION 1 | DEVICE INFORMATION 1 | SERVICE A |
| | | | SERVICE B |
| | | DEVICE INFORMATION 2 | SERVICE B |
| | | ⋮ | ⋮ |
| ⋮ | ⋮ | ⋮ | ⋮ |

FIG. 11A
USER AUTHENTICATION TABLE

| CARD ID | USER ID | PASSWORD | USER INFORMATION | SETTLEMENT INFORMATION |
|---|---|---|---|---|
| 123456 | kenchan | desktop | USER INFORMATION 1 | SETTLEMENT INFORMATION 1 |
| 234567 | takasan | screen | USER INFORMATION 2 | SETTLEMENT INFORMATION 2 |
| ... | ... | ... | ... | ... |

FIG. 11B
SERVICE USER TABLE

| USER INFORMATION | SETTLEMENT INFORMATION | DEVICE INFORMATION | REGISTERED SERVICE |
|---|---|---|---|
| USER INFORMATION 1 | SETTLEMENT INFORMATION 1 | DEVICE INFORMATION 1 | SERVICE A |
| | | | SERVICE B |
| | | DEVICE INFORMATION 2 | SERVICE B |
| ... | ... | ... | ... |
| ... | | ... | ... |

DEVICE REGISTRATION SYSTEM, DEVICE REGISTRATION SERVER, DEVICE REGISTRATION METHOD, DEVICE REGISTRATION PROGRAM, STORAGE MEDIUM, AND TERMINAL DEVICE

CROSS-REFERENCE TO RELATED APPLICATIONS

The present application claims priority from Japanese Application No. 2003-188142 filed Jun. 30, 2003, the disclosure of which is hereby incorporated by reference herein.

BACKGROUND OF THE INVENTION

The present invention relates to device registration systems and the like. For example, the present invention relates to a device registration system that associates a registered user with a registered device by authenticating the registered user and the registered device while maintaining a logical connection.

Recently, consumer electronics (CE) devices are coming to be used more commonly. CE devices are, for example, audiovisual devices such as video recorders, stereo sets, and television sets, household electric appliance products such as rice cookers and refrigerators, or other electronic devices that include computers so that services can be used via a network.

Thus, a CE device holds device authentication information for device authentication. A service server that provides a service executes device authentication before providing the service to the CE device.

Furthermore, by registering a user of the CE device in advance and associating the user with the CE device owned by the user, a more sophisticated service can be provided suitably for the user.

Furthermore, by managing the association between users and CE devices, unauthorized use of CE devices can be prevented. This serves to enhance security of the system.

As described above, the association between users and CE devices is an important task for providing a service involving the CE devices.

Conventionally, for the purpose of such association, for example, a user who has purchased a CE device enters a user ID on a card attached to the CE device (information identifying the CE device, such as the serial number of the CE device, is printed in advance on the card) and sends the card by mail to a registration center, or enters the necessary information on a predetermined registration sheet at the shop where the user purchased the CE device.

Furthermore, according to a product-information providing system and product-information providing method proposed in Japanese Unexamined Patent Application Publication No. 2002-352059, a user who has purchased a CE device or the like is registered online via a network.

According to the proposed art, user information is stored on a storage medium such as an IC card, and a user who has newly purchased a product is registered using the information stored on the IC card.

However, the task of associating a user with a CE device, even if it is executed online, requires the user to enter information relating to the user and information relating to the CE device. This has been a burden for the user.

Furthermore, for example, when the CE device is a small audio device or the like, the capability of displaying text information or an input unit for allowing input by a user is not necessarily adequate for entering such information.

Furthermore, when user information is registered in advance and the information is read for registration, the user must enter user authentication information such as a password. If the input is made via a software keyboard or the like, the user authentication information could be guessed by a third party watching the input operation.

SUMMARY OF THE INVENTION

Accordingly, it is an object of the present invention to provide a device registration system and the like that readily allows device registration and updating of device registration by a user.

The present invention, in a first aspect thereof, provides a device registration system including a terminal device storing device authentication information; and a device registration unit. The terminal device includes an obtaining unit operable to obtain information for identifying a user from an IC card; a confirming unit operable to obtain information confirming that the user is a registered user based on the user identification information; and a sending unit operable to send the confirmation information and the stored device authentication information to the device registration unit while maintaining a logical connection with the device registration unit. The device registration unit includes a user confirmation unit operable to receive the confirmation information from the terminal device and to confirm that the user is a registered user based on the confirmation information; an obtaining unit operable to obtain a result of authentication of the terminal device based on the device authentication information received from the terminal device; and a storage unit operable to store information that is unique to the user and information that is unique to the terminal device in association with each other when the user has been confirmed as a registered user and the terminal device has been authenticated.

The present invention, in a second aspect thereof, provides a device registration server including an information receiving unit operable to receive user confirmation information and device authentication information from a terminal device while maintaining a logical connection with the terminal device, the user confirmation information being usable to confirm that a user is a registered user, and the device authentication information being usable to authenticate the terminal device; a user confirmation unit operable to confirm that the user is a registered user based on the received user confirmation information; a device-authentication-result obtaining unit operable to obtain a result of authentication of the terminal device based on the device authentication information; and a storage unit operable to store information of the user and information of the terminal device in association with each other when the user has been confirmed as a registered user and the terminal device has been authenticated.

The device registration server according to the second aspect may be such that the user confirmation information includes user identification information and password information, the device registration server further including a user-authentication requesting unit operable to request user authentication from a user authentication unit based on the user identification information and the password information, and to obtain a result of the user authentication from the user authentication unit, wherein the user confirmation unit confirms that the user is a registered user based on the result of the user authentication.

The device registration server according to the second aspect may also be such that the user confirmation information is a result of authentication of the user, and the user confirmation unit confirms that the user is a registered user by confirming that the result of the user authentication is correct.

The device registration server according to the second aspect may further include a service providing unit operable to provide a service to the terminal device whose information has been stored by the storage unit; and a settlement-information obtaining unit operable to obtain settlement information set in advance for the user; wherein the storage unit is operable to store information that is unique to the user, information that is unique to the device, and the obtained settlement information in association with each other, the stored settlement information being usable to settle a service charge for the provided service.

The present invention, in a third aspect thereof, provides a device registration method including receiving user confirmation information and device authentication information from a terminal device while maintaining a logical connection with the terminal device, the user confirmation information being usable to confirm that a user is a registered user, and the device authentication information being usable to authenticate the terminal device; confirming that the user is a registered user based on the user confirmation information; obtaining a result of an authentication procedure for the terminal device, the authentication procedure being based on the received device authentication information; and storing information of the user and information of the terminal device in association with each other when the user has been confirmed as a registered user and the terminal device has been authenticated.

The device registration method according to the third aspect may be such that the user confirmation information includes user identification information and password information, and the confirming step includes requesting user authentication based on the user identification information and the password information; obtaining a result of the user authentication; and confirming that the user is a registered user based on the result of the user authentication.

The device registration method according to the third aspect may also be such that the user confirmation information is a result of authentication of the user, and the confirming step includes confirming that the user is a registered user by confirming that the result of the user authentication is correct.

The device registration method according to the third aspect may further include providing a service to the terminal device whose information has been stored in the storing step; and obtaining settlement information set in advance for the user; wherein the storing step stores information that is unique to the user, information that is unique to the terminal device, and the obtained settlement information in association with each other, the stored settlement information being usable to settle a service charge for the provided service.

The present invention, in a fourth aspect thereof, provides a recording medium recorded with instructions for causing a computer to execute a device registration method, the device registration method including receiving user confirmation information and device authentication information from a terminal device while maintaining a logical connection with the terminal device, the user confirmation information being usable to confirm that a user is a registered user, and the device authentication information being usable to authenticate the terminal device; confirming that the user is a registered user based on the received user confirmation information; obtaining a result of an authentication procedure for the terminal device, the authentication procedure being based on the received device authentication information; and storing information of the user and information of the terminal device in association with each other when the user has been confirmed as a registered user and the terminal device has been authenticated.

The recording medium according to the fourth aspect may be such that the user confirmation information includes user identification information and password information, and the confirming step includes requesting user authentication based on the user identification information and the password information; obtaining a result of the user authentication; and confirming that the user is a registered user based on the result of the user authentication.

The recording medium according to the fourth aspect may also be such that the user confirmation information is a result of authentication of the user, and the confirming step includes confirming that the user is a registered user by confirming that the result of the user authentication is correct.

In the recording medium according to the fourth aspect, the device registration method may further include providing a service to the terminal device whose information has been stored in the storing step; and obtaining settlement information set in advance for the user; wherein the storing step stores information that is unique to the user, information that is unique to the device, and the obtained settlement information in association with each other, and the stored settlement information is usable to settle a service charge for the provided service.

The present invention, in a fifth aspect thereof, provides a system for performing device registration, the system including a processor operable to execute instructions; and instructions for performing a device registration method, the method including receiving user confirmation information and device authentication information from a terminal device while maintaining a logical connection with the terminal device, the user confirmation information being usable to confirm that a user is a registered user, and the device authentication information being usable to authenticate the terminal device; confirming that the user is a registered user based on the received user confirmation information; obtaining a result of an authentication procedure for the terminal device based on the received device authentication information; and storing information of the user and information of the terminal device in association with each other when the user has been confirmed as a registered user and the terminal device has been authenticated.

The present invention, in a sixth aspect thereof, provides a terminal device storing device authentication information, the terminal device including a user-identification-information obtaining unit operable to obtain information for identifying a user from an IC card; a user-confirmation-information obtaining unit operable to obtain information for confirming that the user is a registered user based on the user identification information; and an information sending unit operable to send the confirmation information and the stored device authentication information to a device registration unit for storing information that is unique to the terminal device and information that is unique to the user in association with each other while maintaining a logical connection with the device registration unit.

The terminal device according to the sixth aspect may further include a password-information obtaining unit operable to obtain password information, wherein the confirmation information is composed using the user identification information and the password information.

The terminal device according to the sixth aspect may further include a password-information obtaining unit operable to obtain password information; and a user-authentication-result obtaining unit operable to request user authentication from a user authentication unit based on the user identification information and the password information, and to obtain a result of the user authentication from the user authentication unit; wherein the obtained confirmation information includes the result of the user authentication.

The present invention, in a seventh aspect thereof, provides a device registration method including obtaining information for identifying a user from an IC card; obtaining information for confirming that the user is a registered user based on the user identification information; and sending the confirmation information and stored device authentication information to a device registration unit for storing information that is unique to the terminal device and information that is unique to the user in association with each other while maintaining a logical connection with the device registration unit.

The device registration method according to the seventh aspect may further include obtaining password information, wherein the obtained confirmation information is composed using the user identification information and the password information.

The device registration method according to the seventh aspect may further include obtaining password information; requesting user authentication from a user authentication unit based on the user identification information and the password information; and obtaining a result of the user authentication from the user authentication unit; wherein the obtained confirmation information includes the result of the user authentication.

The present invention, in an eighth aspect thereof, provides a recording medium recorded with instructions for causing a computer to execute a device registration method, the device registration method including obtaining information for identifying a user from an IC card; obtaining information for confirming that the user is a registered user based on the user identification information; and sending the confirmation information and stored device authentication information to a device registration unit for storing information that is unique to the terminal device and information that is unique to the user in association with each other, while maintaining a logical connection with the device registration unit.

The recording medium according to the eighth aspect may further include obtaining password information, wherein the obtained confirmation information is composed using the user identification information and the password information.

The recording medium according to the eighth aspect may further include obtaining password information; requesting user authentication from a user authentication unit based on the user identification information and the password information; and obtaining a result of the user authentication from the user authentication unit; wherein the obtained confirmation information includes the result of the user authentication.

The present invention, in a ninth aspect thereof, provides a system for performing device registration, the system including a processor operable to execute instructions; and instructions for performing a device registration method, the method including obtaining information for identifying a user from an IC card; obtaining information for confirming that the user is a registered user based on the user identification information; and sending the confirmation information and stored device authentication information to a device registration unit for storing information that is unique to the terminal device and information that is unique to the user in association with each other, while maintaining a logical connection with the device registration unit.

According to the present invention, a user is readily allowed to register a device to a service or the like.

BRIEF DESCRIPTION OF THE DRAWINGS

FIG. 1 is a diagram showing an example of the configuration of a device registration system according to an embodiment of the present invention;

FIGS. 2A to 2C are diagrams showing examples of various tables used in the device registration system;

FIG. 3 is a flowchart for explaining a device registration procedure;

FIGS. 4A to 4D are diagrams showing examples of screens that are displayed during device registration;

FIG. 6 is a diagram showing a modification of a device-user association table;

FIGS. 9A to 9C are diagrams showing examples of various tables used in the second modification;

FIGS. 11A and 11B are diagrams showing examples of various tables used in the third modification.

DETAILED DESCRIPTION

Figure 5:
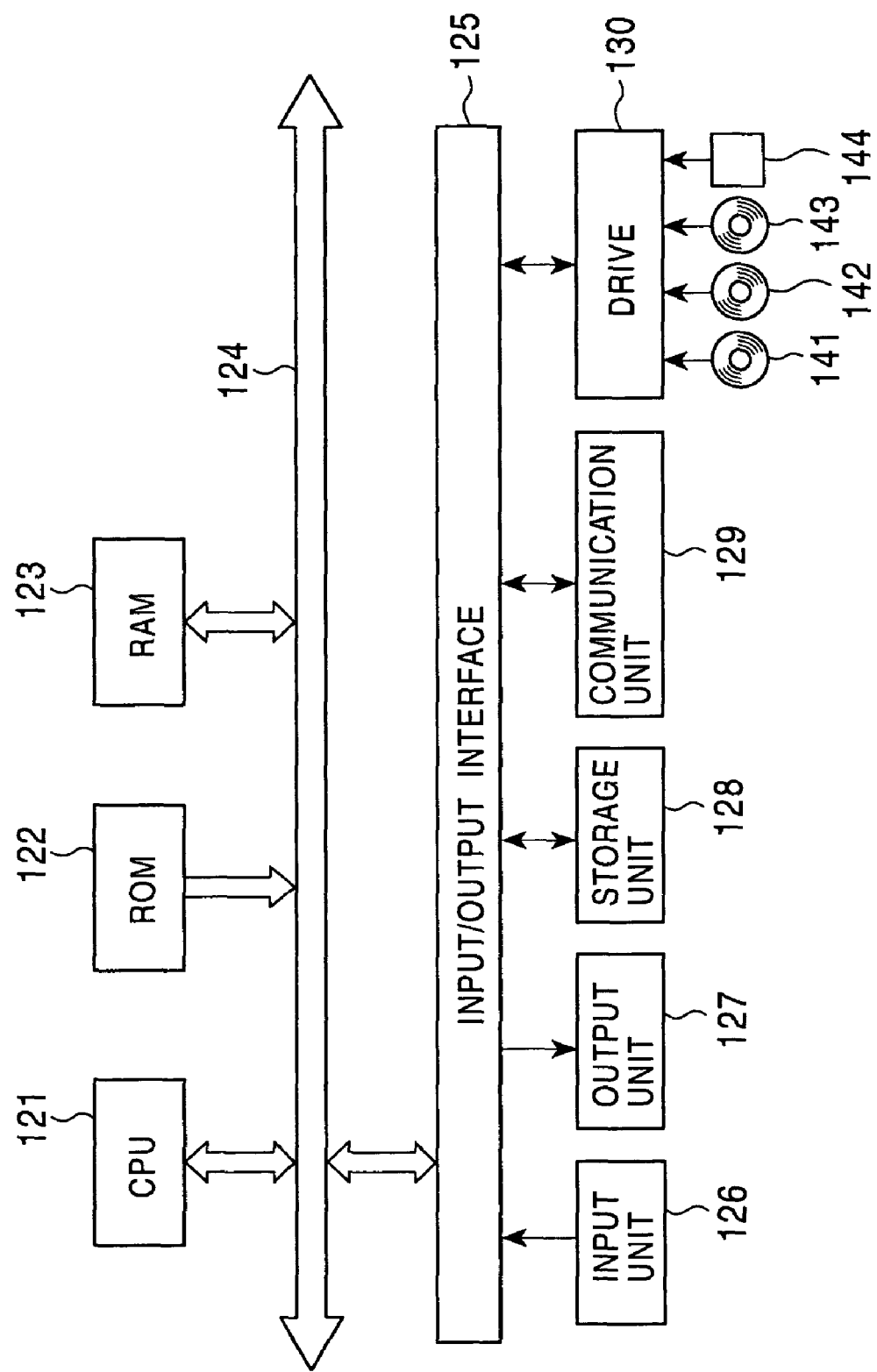
FIG. 5 is a diagram showing an example of the hardware configuration of a CE device.

Now, a preferred embodiment of the present invention will be described in detail with reference to the drawings.

(1) Overview of the Preferred Embodiment

User authentication and device authentication of a CE device are executed in a single session, and the user and the CE device are associated with each other if these authentications succeed. It is assumed herein that the user and the CE device have been registered in advance to allow the authentications.

Referring to FIG. 1, a CE device 9 obtains information needed for user authentication from an IC card 7 and a portable memory 6.

The CE device 9 holds device authentication information. The CE device 9 sends the device authentication information and the information for user authentication obtained from the IC card 7 and the memory 6 to a device registration server 5.

The device registration server 5 sends the information for user authentication to a user authentication server 2, and sends the device authentication information to a device authentication server 3.

The user authentication server 2 executes user authentication, and sends user information relating to the user to the device registration server 5 if the user authentication succeeds.

The device authentication server 3 executes device authentication, and sends device information relating to the device to the device registration server 5 if the device authentication succeeds.

Then, the device registration server 5 receives the user information and the device information, and associates the user information and the device information with each other.

The device registration server 5 executes the above operations in a single session. Thus, it is ensured that the information for user authentication and the device authentication information have both been transmitted from the CE device 9. Therefore, the user and the CE device 9 are associated correctly with each other.

Although all of the processing is executed in a single session in this embodiment, the user and the CE device 9 can be associated correctly with each other as long as at least the processing for receiving the information for user authentication and the processing for receiving the device authentication information are executed in a single session.

(2) Details of the Preferred Embodiment

FIG. 1 is a diagram showing an example of the configuration of a device registration system 1 according to this embodiment. In the device registration system 1, the user authentication server 2, the device authentication server 3, the device registration server 5, and the CE device 9 are arranged so that these components can communicate with each other via a network.

The CE device 9 is a terminal device that is capable of carrying out communications via a network. The CE device 9 holds a unique device ID for distinguishing itself from other CE devices, and device authentication information for executing device authentication. The device ID and the device authentication information are embedded in advance in the CE device 9 at the manufacturing factory or the like.

The device authentication information is generated, for example, by combining the device ID and a passphrase (a long password or a key shared with a server) or secret key information that is unique to the device.

The CE device 9 is, for example, a stereo set, a television set, a video recorder, an air conditioner, a bath boiler, a lighting device, a lavatory bowl, or various other electric products.

By implementing these devices as CE devices, for example, in the case of a stereo set, a television set, or a video recorder, remote operations such as downloading content and reservation of recording are allowed. In the case of an air conditioner, a bath boiler, or a lighting device, remote operations such as turning the device on or off are allowed. In the case of a lavatory bowl, waste of a user can be sensed by a sensor and data can be sent to a healthcare server to check the medical status of the user.

The CE device 9 includes a reader/writer that is capable of carrying out short-range wireless communications with a contactless IC card to read or write data, and it is thus capable of carrying out wireless communications with an IC card 7 that is a contactless IC card. Alternatively, a reader/writer may be provided externally to the CE device 9.

The CE device 9 also has a slot that allows the portable memory 6 to be mounted or removed, and it is capable of writing data to or reading data from the portable memory 6 mounted thereon.

Furthermore, the CE device 9 includes a display for displaying text information or images.

The IC card 7 includes a communication unit for carrying out wireless communications with a reader/writer, a storage unit for storing data and programs, and a calculating unit for executing calculations according to the programs. The IC card 7 is driven by power received wirelessly from a reader/writer.

The IC card 7 stores a card ID that is unique identification information, and it sends the card ID to the CE device 9 in response to a request from the CE device 9. The card ID is associated with a user ID and a password at the user authentication server 2, which will be described later. Thus, the card ID serves as user identification information for identifying a user.

In this embodiment, a contactless IC card is used as the IC card 7. However, without limitation to a contactless IC card, any device that is capable of storing unique information associated with a user ID and providing the information to the CE device 9, such as a contact IC card or a magnetic card, may be used. Also, a cellular phone including a contactless communication device having the equivalent functions of a contactless IC card may be used.

Alternatively, information that is specific to a user, such as a fingerprint or voiceprint of the user, may be associated with a user ID so that the CE device 9 can obtain the information.

The portable memory 6 is a semiconductor memory that is implemented in a small size for portable use, and it is capable of storing various data so as to allow reading and writing. The portable memory 6 can be mounted on other computer products such as a personal computer, as well as the CE device 9. The portable memory 6 is a non-volatile memory that holds data even when it is detached from these products.

The portable memory 6 stores in advance a memory ID that is unique ID information, such that the memory ID cannot be erased or changed, so that the portable memory 6 can be identified by the memory ID.

Furthermore, in this embodiment, the portable memory 6 stores password information for identifying the password of a user, such that the password information can be read from the CE device 9.

The card ID and the password information are information for user authentication that is obtained by the CE device 9 and that is used as user confirmation information for identifying user authentication information at the user authentication server 2.

In this embodiment, the CE device 9 obtains password information from the portable memory 6. Alternatively, a user may directly enter a password to the CE device 9. Furthermore, the portable memory 6 need not be used if all the information for user authentication is held in the IC card 7 or if the possession of IC card 7 itself is used as a proof of identity.

The CE device 9 stores in advance connecting information for connecting to the device registration server 5, such as a uniform resource locator (URL), or stores connecting information provided by another server. When the device is registered, the CE device 9 connects to the device registration server 5, and sends information for user authentication read from the IC card 7 and the portable memory 6 and a device ID and device authentication information embedded in the CE device 9 to the device registration server 5.

The user authentication server 2 is a server apparatus for authenticating users who have been registered in advance. The user authentication server 2 receives information for user authentication from the CE device 9, executes user authentication using the information for user authentication, and sends a result of user authentication to the CE device 9. Furthermore, if the user authentication succeeds, the user authentication server 2 also sends user information to the device registration server 5 together with the result of user authentication.

FIG. 2A is a diagram showing an example of a user authentication table stored in the user authentication server 2.

As shown in FIG. 2A, in the user authentication table, a card ID of the IC card 7 owned by the user, a user ID and password information set by the user, and user information entered by the user at the time of user registration are stored such that these pieces of information are associated with each other.

Of these pieces of information, the user information includes basic personal information such as a name, an address, a phone number, and an e-mail address, and also includes other information such as a date of birth, a business address, and hobbies. The user authentication server 2 executes user authentication using the information recorded in the user authentication table. In this embodiment, it is assumed that the user is registered in advance in the user authentication server 2.

Using the user authentication table described above, the user authentication server 2 executes user authentication in the following manner. First, based on a card ID received from the CE device 9, the user authentication server 2 identifies password information that is uniquely associated with the user ID and the card ID.

Then, the user authentication server 2 receives password information from the CE device 9 and identifies the password information, and checks matching with the password information that has been identified earlier. If these pieces of password information match, the user authentication succeeds. On the other hand, if the pieces of password information do not match, the user authentication fails.

The password information that is received from the portable memory 6 is, for example, a memory ID. The memory ID may be associated with a password in advance in the user authentication server 2, or an encrypted password may be decrypted in the user authentication server 2.

If the user directly enters a password to the CE device 9 instead of using the portable memory 6, the user authentication server 2 compares the password entered by the user with a password identified based on the card ID.

Referring back to FIG. 1, the device authentication server 3 is a server apparatus for executing device authentication of the CE device 9. The device authentication server 3 receives device authentication information from the CE device 9, executes device authentication, and sends a result of device authentication to the device authentication server 3. If the device authentication succeeds, the device authentication server 3 sends device information of the CE device 9 to the CE device 9 together with the result of device authentication.

The CE device 9 may be registered in advance prior to sales on the market to allow device authentication with the CE device 9. Alternatively, the status of the CE device 9 may be changed by a user's operation prior to the registration of a service to allow device authentication by itself.

FIG. 2B is a diagram showing an example of a device authentication table stored in the device authentication server 3.

In the device authentication table, a device ID that is ID information for identifying a device, device authentication information for executing device authentication, device information relating to the device, and a registration number or the like are associated with each other.

The device information includes information relating to the CE device 9, for example, a product code, a serial number, a date of manufacture, and manufacturer information.

The registration number is a number that is assigned when these pieces of information are uploaded to the device authentication server 3.

The device authentication server 3 described above receives a device ID and device authentication information from the CE device 9, and executes device authentication of the CE device 9 by comparing the device ID and the device authentication information with information in the device authentication table, by receiving a digest value generated from the device authentication information instead of the device authentication itself and comparing the digest value, or by receiving a digital signature encrypted with a secret key of a public-key cryptosystem and decrypting the digital signature with an associated public key for verification.

More specifically, the device authentication server 3 searches the device authentication table for the device ID and the device authentication information received from the CE device 9. The device authentication succeeds if the device ID and the device authentication information found by the search are associated with each other, if a digest value generated from device authentication information associated with the device ID found by the search matches, or if verification of signature information using device authentication information associated with the device ID, i.e., using key information, succeeds.

On the other hand, if at least one of the device ID and the device authentication information is absent in the device authentication table, or if the device ID and the device authentication are present but are not associated with each other, the device authentication fails.

Referring back to FIG. 1, the device registration server 5 is a server apparatus for associating a user with the CE device 9.

The device registration server 5 receives information for user authentication, including a card ID and password information that serve as user confirmation information, and information for device authentication, including a device ID and device authentication information, from the CE device 9 by receiving means.

Then, the device registration server 5 sends the information for user authentication to the user authentication server 2 to request user authentication, and receives a result of user authentication and user information of the user from the user authentication server 2 in order to confirm the user.

Furthermore, the device registration server 5 sends the information for device authentication to the device authentication server 3 to request device authentication, and receives a result of device authentication and device information of the CE device 9 from the device authentication server 3.

Then, the device registration server 5 stores the user information and the device information such that these pieces of information are associated with each other.

FIG. 2C is a diagram showing an example of a device-user association table generated by the device registration server 5. The device-user association table includes user information and device information, and the device information is associated with the user information.

If a user owns a plurality of CE devices, a plurality of sets of device information are associated with the user information. Furthermore, each time a user newly purchases a CE device and registers the CE device or each time a registration is cancelled, the device registration server 5 updates the device-user association table.

The device registration server 5 executes all of the processing from receipt of a device registration request from the CE device 9 to completion of association between the user and the CE device 9 in a single session. A session herein refers to a continuous logical connection in communication via a network.

Even if a communication circuit temporarily becomes disconnected due to a problem or the like, when the circuit has been recovered, for example, a session can be recovered using a one-time password, or information to be transmitted is temporarily stored in the device so that a series of exchanges of data over the network can be completed asynchronously with user operations when the circuit has been recovered.

More specifically, when establishing a session, the device registration server 5 issues a one-time password to the CE device 9. When a communication circuit becomes disconnected and is then recovered, the CE device 9 sends the one-time password to the device registration server 5. Accordingly, the device registration server 5 is able to recognize the CE device 9, so that the session can be resumed from the point where the session had become disconnected.

As described above, the device registration server 5 receives information for user authentication and information for device authentication from the CE device 9 in a single session. Thus, the device registration server 5 is able to confirm that the information for user authentication is read and transmitted from the CE device 9.

Therefore, a user that has passed user authentication based on information for user authentication transmitted in a session and the CE device 9 that has passed device authentication based on information for device authentication transmitted in the same session are associated with each other. Accordingly, the user and the CE device 9 are associated correctly with each other, so that spoofing or the like by a third party is prevented.

Thus, the user and the CE device 9 can be associated with each other by executing at least processing for receiving information for user authentication and information for device authentication from the CE device 9 in a single session.

In this embodiment, if a session becomes disconnected in the middle for some reason, the session is resumed from the beginning.

FIG. 3 is a flowchart for explaining the device registration procedure.

First, in step S2, the user connects the CE device 9 to a network, sets the IC card 7 in the reader/writer of the CE device 9, and sends a request for device registration to the device registration server 5.

Then, in step S10, the device registration server 5 sends a request for user authentication to the CE device 9.

In step S4, the CE device 9 obtains a card ID from the IC card 7, obtains password information from the portable memory 6, and sends the card ID and the password information to the device registration server 5. Instead of using the portable memory 6, the user may enter a password directly to the CE device 9.

In step S12, the device registration server 5 receives the card ID and the password information from the CE device 9, and sends the card ID and the password information to the user authentication server 2.

In step S30, the user authentication server 2 receives the card ID and the password information from the CE device 9, and executes user authentication. It is assumed herein that the user authentication succeeds.

Then, in step S32, the user authentication server 2 sends an authentication result indicating successful user authentication and user information of the user to the device registration server 5.

In step S14, the device registration server 5 temporarily stores the user information transmitted from the user authentication server 2, and issues a device authentication request to the CE device 9.

Then, in step S6, the CE device 9 reads a device ID and device authentication information stored in advance in the CE device 9, and sends the device ID and the device authentication information to the device registration server 5.

In order to enhance security, the CE device 9 stores the device authentication information in an encrypted form, and the CE device 9 decrypts the device authentication information when sending it.

In step S16, the device registration server 5 receives the device ID and the device authentication information from the CE device 9, and sends the device ID and the device authentication information to the device authentication server 3.

In step S40, the device authentication server 3 receives the device ID and the device authentication information from the device registration server 5, and executes device authentication of the CE device 9. It is assumed herein that the device authentication succeeds.

In step S42, the device authentication server 3 sends a notification of successful device authentication and device information of the CE device 9 to the device registration server 5.

In step S18, the device registration server 5 stores the device information received from the device authentication server 3 and the user information that has been temporarily stored earlier in association with each other, thereby updating the device-user association table.

Then, in step S20, the device registration server 5 sends a notification of completion of registration to the CE device 9.

In step S8, the CE device 9 receives the notification of completion of registration from the device registration server 5, and presents the notification to the user.

The device registration process is completed by the procedure described above.

If the user authentication or the device authentication fails, the device registration server 5 sends a notification to that effect to the CE device 9.

Furthermore, before updating the device-user association table, the device registration server 5 may cause the CE device 9 to present information relating to user information and device information in association with each other so that the user may confirm the information.

In this embodiment, the device registration server 5 requests the CE device 9 to send information for device authentication upon completion of user authentication. However, without limitation to the embodiment, for example, information for user authentication and information for device authentication may be received from the CE device 9 before executing user authentication and device authentication. Alternatively, device information may be executed before requesting user authentication.

FIGS. 4A to 4D show examples of a series of screens that are displayed on the display of the CE device 9 during device registration.

After purchasing the CE device 9, the user selects a device registration mode from a setup menu displayed on the CE device 9.

Then, the screen shown in FIG. 4A is displayed to prompt the user to set the IC card 7 and the portable memory 6.

When the user has set the IC card 7 in the reader/writer of the CE device 9 and set the portable memory 6 in the slot for the portable memory, user authentication and device authentication start, and a screen indicating that authentication is in progress is displayed, as shown in FIG. 4B.

When the user authentication and the device authentication have been completed, the device registration server 5 may send information confirming the content of the registration to the CE device 9. In that case, the user and the CE device 9 to be associated with each other are displayed on the CE device 9, as shown in FIG. 4C. The user selects "Yes" to accept the association or selects "No" to reject the association.

When the device registration has been completed, a notification of completion of registration is displayed on the CE device 9, as shown in FIG. 4D.

FIG. 5 is a diagram showing an example of the hardware configuration of the CE device 9.

A central processing unit (CPU) 121 executes various processing according to programs stored in a read-only memory (ROM) 122 or programs loaded from a storage unit 128 into a random access memory (RAM) 123. The ROM 122 stores basic programs, parameters, and the like that are needed for the operation of the CE device 9. The RAM 123 provides a working area needed by the CPU 121 to execute various processing.

The storage unit 128 stores programs and data needed for the operation of the CE device 9. The storage unit 128 is implemented by a storage device such as a hard disk or a semiconductor memory. The device ID and device authentication information used for device authentication are stored in the storage unit 128. Furthermore, a program for connecting to the device registration server 5 at the time of device registration and for executing a device registration process is stored in the storage unit 128. Other programs stored in the storage unit 128 include an operating system (OS) for achieving basic functions such as file input/output and control of the components of the CE device 9.

The CPU 121, the ROM 122, and the RAM 123 are connected to each other via a bus 124. The bus 124 is also connected to an input/output interface 125.

The input/output interface 125 is connected to an input unit 126 including a keyboard and a mouse, an output unit 127 including a cathode-ray tube (CRT) display or a liquid crystal display (LCD) and a speaker, the storage unit 128 implemented by a hard disk or the like, and a communication unit 129 implemented by a modem, a terminal adaptor, or the like. The input/output interface 125 is also connected to the reader/writer of the IC card 7, and to the slot for mounting the portable memory 6.

The communication unit 129 is a functional unit for carrying out communications via a network. For example, the communication unit 129 connects to the device registration server 5 and intermediates communications between the CE device 9 and the device registration server 5.

Furthermore, the input/output interface 125 is connected to a drive 130 as needed, on which a magnetic disk 141, an optical disk 142, a magneto-optical disk 143, a memory card 144, or the like is mounted as needed, and a computer program read therefrom is installed on the storage unit 128 as needed.

The configurations of the user authentication server 2 and the device authentication server 3 are basically the same as the configuration of the CE device 9, so that descriptions thereof will be omitted.

The device registration server 5 in this embodiment associates user information with device information in the device-user association table. However, without limitation to the embodiment, information identifying a user and information identifying the CE device 9 may be associated with each other by other methods.

FIG. 6 is a diagram showing an example of the device-user association table in which user IDs and device IDs are associated with each other. By associating device IDs with user IDs, a user can be associated with the CE device 9.

In this embodiment, as an example, the user authentication server 2, the device authentication server 3, and the device registration server 5 are used in the device registration system 1. Alternatively, each of the server apparatuses may be implemented by a system composed of a plurality of servers, or the functions of the three server apparatuses may be implemented by a single server.

As described above, in this embodiment, customer information or settlement information is identified by personal authentication using an IC card, and device authentication is also executed in the same session. Accordingly, registration of an owner of the CE device 9 or a device used for a specific service can be performed by a very intuitive operation without newly entering characters or the like.

The input device of the CE device 9 may be a jog dial, a slide switch, or the like, and it suffices for the output device to have the capability of displaying one line.

Furthermore, a device may be registered not from a main unit of the device but by entering an encoded text string identifying an individual product using the numeric keys of a remote controller or the like.

In this embodiment, user authentication is executed using an IC card and a memory card storing password information. However, device registration may be implemented through user authentication and device authentication using an IC card without a memory card storing password information, and a personal identification number (PIN) that is entered for personal identification to a device to be registered.

Furthermore, when a cellular phone including a contactless communication device is used as described earlier instead of a contactless IC card, user authentication may be executed based on a PIN entered from the cellular phone.

Furthermore, by registering user information and the terminal ID of a cellular phone registered by a user at a user authentication server, user authentication that identifies the user based on the terminal ID of the cellular phone is allowed. In that case, if the cellular phone supports a function of infrared communications, the terminal ID can be transmitted from a device to be registered together with device authentication information at the time of device authentication. When the user is identified based on the terminal ID of the cellular phone, the terminal ID is used in combination with a PIN entered from the cellular phone for user authentication, allowing device registration through device authentication.

In this embodiment, password information is input from the portable memory 6 of the CE device 9. Alternatively, for example, user authentication may be executed using only the IC card 7 or the IC card 7 and an identification number consisting of about four numeric digits. When user authentication is executed using only the IC card 7, the IC card 7 is set to the reader/writer of the CE device 9, and the CE device 9 is connected to the device registration server 5, whereby device registration of the CE device 9 is allowed.

According to the embodiment described above, the following advantages are achieved.

(1) Since the device registration server 5 receives information for device registration and information for user registration from the CE device 9 in a single session, the device registration server 5 can associate a user and the CE device 9 accurately with each other.

(2) A user can register an association between the user and the CE device 9 simply by setting the IC card 7 and the portable memory 6.

(3) When the portable memory 6 is not used, an association between the user and the CE device 9 can be registered simply by setting the IC card 7 to the CE device 9 and entering a password to the CE device 9.

(4) The user need not enter information, or needs to input only a password. Thus, the user can readily register the CE device 9 even when the display capability of the CE device 9 is low.

(5) The user need not enter information, or needs to enter only a password. Thus, the user can readily register the CE device 9 even when the text input capability of the CE device 9 is low.

(6) Since the user and the CE device 9 are associated with each other automatically via a network, manual operations are not needed, so that registration can be executed quickly and at low cost.

First Modification

In a first modification, a user is associated with the CE device 9 without passing information for user authentication to the device registration server 5. This is because, since the device registration server 5 can be a server apparatus that provides a commercial service managed by a third party, it is preferred not to pass information for user authentication to the device registration server 5 in order to improve security.

As described above, the device registration server 5 may be implemented as a service providing server that simply associates a user with the CE device 9 and provides a service to the CE device 9.

The network configuration of this modification is the same as that of the device registration system 1, so that description will be given using the same numerals for the corresponding components.

Figure 7:
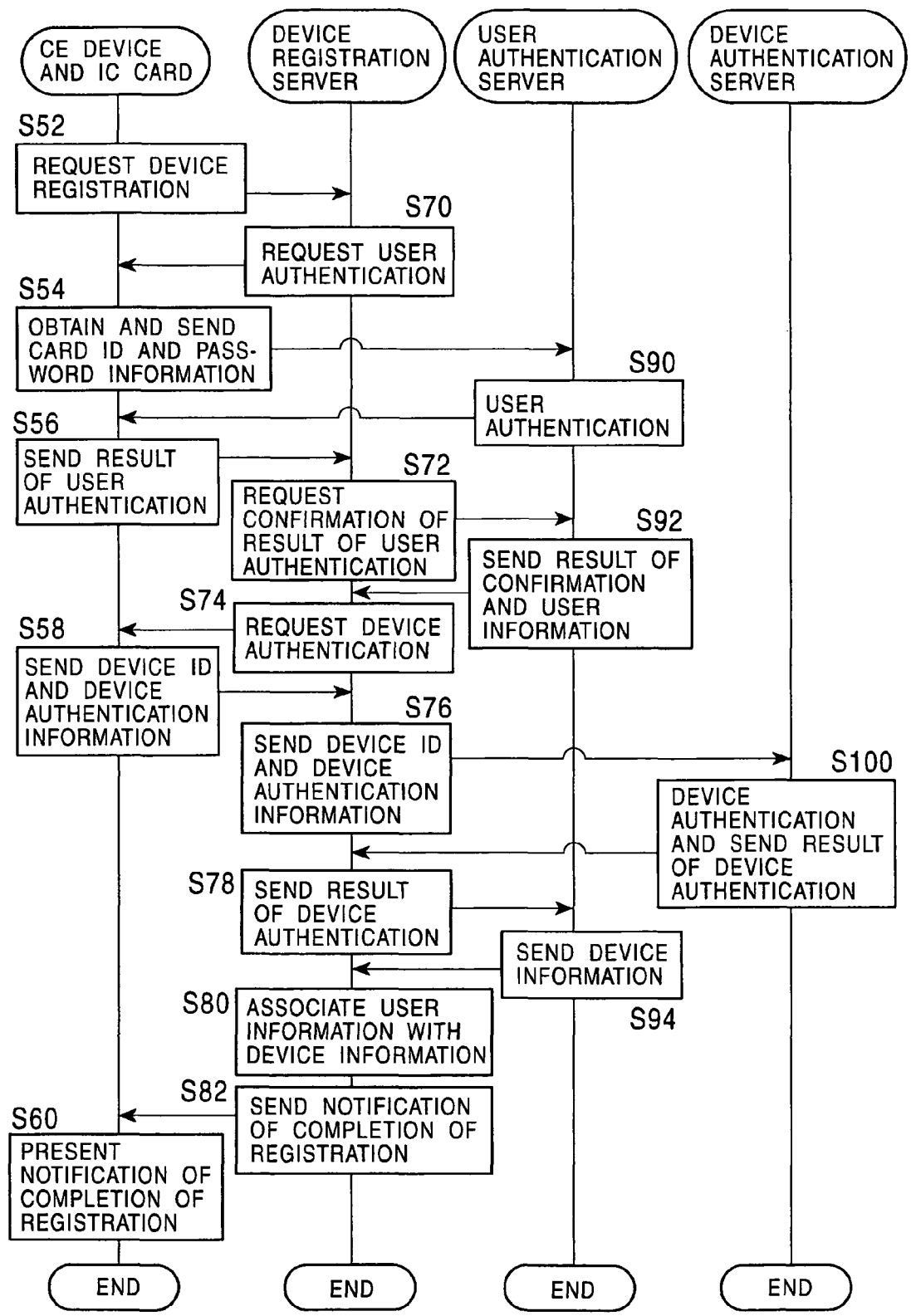
FIG. 7 is a flowchart for explaining a first modification of the present invention.

FIG. 7 is a flowchart for explaining the first modification.

First, in step S52, the CE device 9 issues a device registration request to the device registration server 5.

Then, in step S70, the device registration server 5 issues a user authentication request to the CE device 9.

Then, in step S54, the CE device 9 obtains a card ID from the IC card 7, obtains password information from the portable memory 6, and sends these pieces of information for user authentication to the user authentication server 2.

In step S90, the user authentication server 2 receives the information for user authentication from the CE device 9, executes the user authentication, and sends the result of the user authentication to the CE device 9. It is assumed herein that the user authentication succeeds.

In step S56, the CE device 9 receives the result of the user authentication from the user authentication server 2, and sends (i.e., redirects) the result of the user authentication to the device registration server 5.

In step S72, the device registration server 5 receives the result of the user authentication from the CE device 9, and requests that the user authentication server 2 confirm that the result of the user authentication is a result of user authentication executed by the user authentication server 2.

The confirmation can be executed using, for example, a one-time token. A one-time token is a random value with a sufficient length that can be used only once after issuance thereof. More specifically, the user authentication server 2 sends a one-time token to the CE device 9 together with the result of the user authentication. At this time, the user authentication server 2 stores the result of the user authentication and the one-time token in combination with one another.

Then, the CE device 9 sends the one-time token to the device registration server 5 together with the result of the user authentication. The device registration server 5 requests that the user authentication server 2 confirm the result of the user authentication using the one-time token.

The user authentication server 2 can confirm that the result of the user authentication received by the device registration server 5 is a result of the user authentication executed by the user authentication server 2 by comparing the one-time token received from the device registration server 5 with the combination of the result of the user authentication and the one-time token stored earlier.

After confirming the result of the user authentication as described above, in step S92, the user authentication server 2 sends a result of the confirmation and user information to the device registration server 5.

Upon receiving these pieces of information from the user authentication server 2, the device registration server 5 confirms that the result of the user authentication received from the CE device 9 is correct, and stores the user information.

Then, in step S74, the device registration server 5 sends a device authentication request to the CE device 9.

Then, in step S58, the CE device 9 sends a device ID and device authentication information to the device registration server 5.

In step S76, the device registration server 5 receives the device ID and the device authentication information from the CE device 9, and sends the device ID and the device authentication information to the device authentication server 3.

In step S100, the device authentication server 3 receives the device ID and the device authentication information from the device registration server 5, executes device authentication, and sends the result of the device authentication to the device registration server 5. It is assumed herein that the device authentication succeeds.

In step S78, the device registration server 5 redirects and sends the result of the device authentication received from the device authentication server 3 to the user authentication server 2. At this time, the device registration server 5 also sends information for identifying the CE device 9, such as the device ID, to the user authentication server 2.

The user authentication server 2 stores information relating to the user such as a user ID, the device ID, and device information in association with each other. In step S94, the user authentication server 2 sends device information of the CE device 9 that has passed device authentication to the device registration server 5.

In step S80, the device registration server 5 receives the device information, and stores the device information in association with the user information stored earlier.

Then, in step S82, the device registration server 5 sends a notification of completion of registration to the CE device 9.

In step S60, the CE device 9 receives the notification of completion of registration from the device registration server 5, and presents the notification to the user.

The device registration process is completed by the procedure described above.

In this modification, the user authentication server 2 stores device information and provides the device information to the device registration server 5. However, similarly to the preferred embodiment described above, the device authentication server 3 may store device information and provide the device information to the device registration server 5.

According to the first modification described above, a user and the CE device 9 can be associated with each other at the device registration server 5 without passing information for user authentication to the device registration server 5.

Second Modification

In a second modification, prepayment information of a user is further associated with the user and the CE device 9. Prepayment is a method of settlement, and it is a system in which a user deposits money in advance in a prepayment account and the charge for the use of a service is settled by subtracting it from the money deposited.

The prepayment system is used when using a fee-based service, for example, by presenting information identifying a user's prepayment account, such as a prepayment ID. More specifically, when using such a service, a user enters a prepayment ID to the CE device 9, or causes the reader/writer of the CE device 9 to read a contactless IC card storing a prepayment ID.

In the second modification, the prepayment information of the user is associated with the user information and the device information so that a fee-based service can be used without entering a prepayment ID after executing device authentication of the CE device 9.

Figure 8:
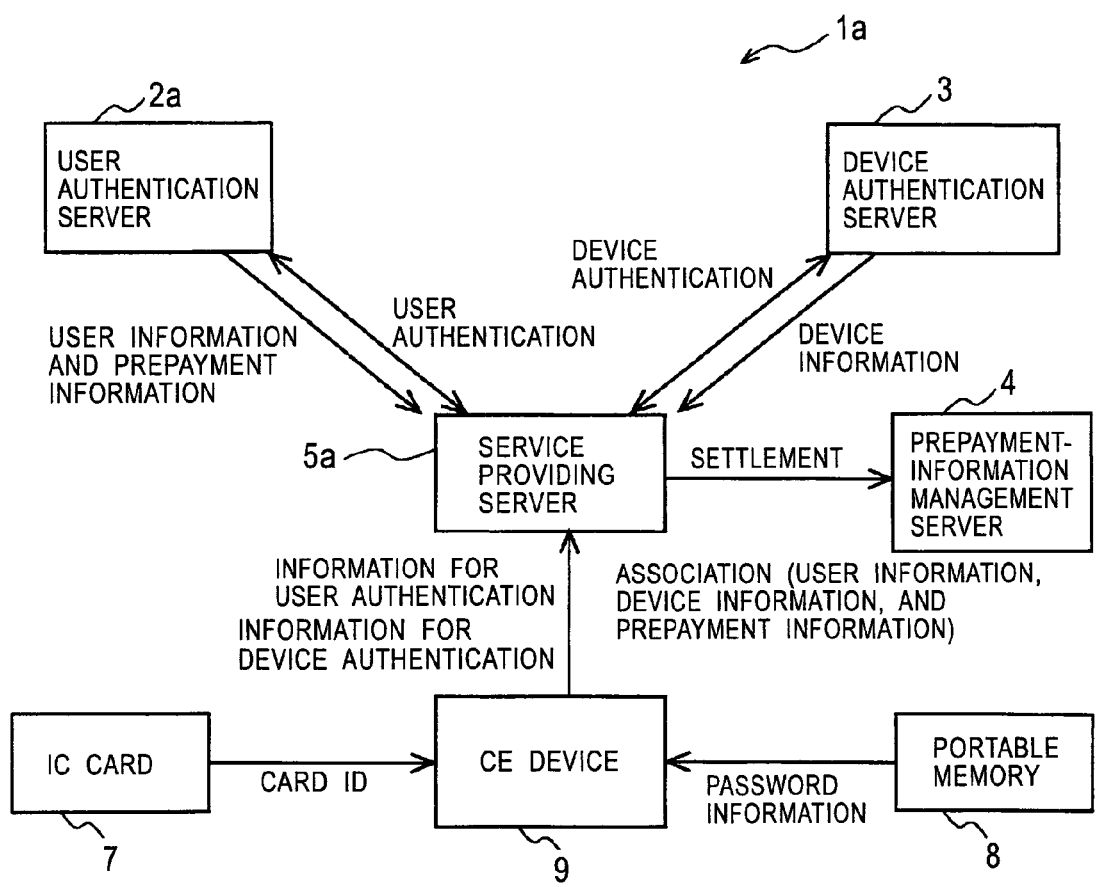
FIG. 8 is a diagram showing an example of the configuration of a device registration system according to a second modification of the present invention.

FIG. 8 is a diagram showing an example configuration of a device registration system 1*a* according to the second modification. Components corresponding to those in the preferred embodiment described above are designated by the same numerals, and descriptions thereof will be omitted.

A service providing server 5*a* uses the same procedure as in the preferred embodiment to associate user information with device information.

The service providing server 5*a* is capable of associating a user with the CE device 9 in a manner similar to the device registration server 5 in the preferred embodiment, and is also capable of providing various services to the CE device 9.

The service providing server 5*a* associates a user with the CE device 9 in a manner similar to the device registration server 5. Furthermore, the service providing server 5*a* obtains prepayment information from a user authentication server 2*a* together with user information, and associates the prepayment information with the user information. That is, the service providing server 5*a* obtains settlement information.

The prepayment information is information identifying a prepayment account of a user, provided in a prepayment-information management server 4.

When providing a fee-based service to the CE device 9, the service providing server 5*a* sends service charge information and prepayment information to the prepayment-information management server 4 to request payment of the service charge.

Upon receiving the bill of the service charge from the service providing server 5*a*, the prepayment-information management server 4 identifies a prepayment account of the user based on the prepayment information, and subtracts the service charge.

As described above, the user can use prepayment information for settlement, so that the prepayment information serves as settlement information in this modification.

FIG. 9A is a diagram showing an example of a user authentication table stored in the user authentication server 2*a*. In addition to the information in the user authentication table described in relation to the preferred embodiment, prepayment information of the user is also associated therewith.

When sending user information to the service providing server 5*a* after user authentication, the user authentication server 2*a* also sends prepayment information of the user.

FIG. 9B is a diagram showing an example of the logical structure of a prepayment information database managed by the prepayment-information management server 4.

As shown in FIG. 9B, in the prepayment information database, prepayment information, log data, and the like are associated with each other, and a prepayment account is provided for each user. The prepayment information includes information needed for managing the prepayment account of the user. A prepayment account can be identified based on the prepayment information. The log data includes records of deposits to and payments from the prepayment account. The current balance of the prepayment account can be determined from the log data. A sum is added for depositing, and a sum is subtracted for settlement.

FIG. 9C is a diagram showing an example structure of a service user table stored in the service providing server 5*a*.

As shown in FIG. 9C, user information, prepayment information, device information, and registered services are associated with each other in the table. More specifically, the service providing server 5*a* stores user information and prepayment information received from the user authentication server 2*a* and device information received from the device authentication server 3 such that these pieces of information are associated with each other.

Furthermore, in the second modification, a service that can be used may be set for each CE device 9. For example, the CE device 9 that is identified by device information 1 can receive a service A and a service B.

The user can select services to use when registering the CE device 9. After registration, user information, prepayment information, and services selected are displayed on the CE device 9, and the user can confirm the information.

As described above, according to the second modification, the user can set services that can be used by the CE device 9, and can register a prepayment account for settling service charges.

Third Modification

Figure 10:
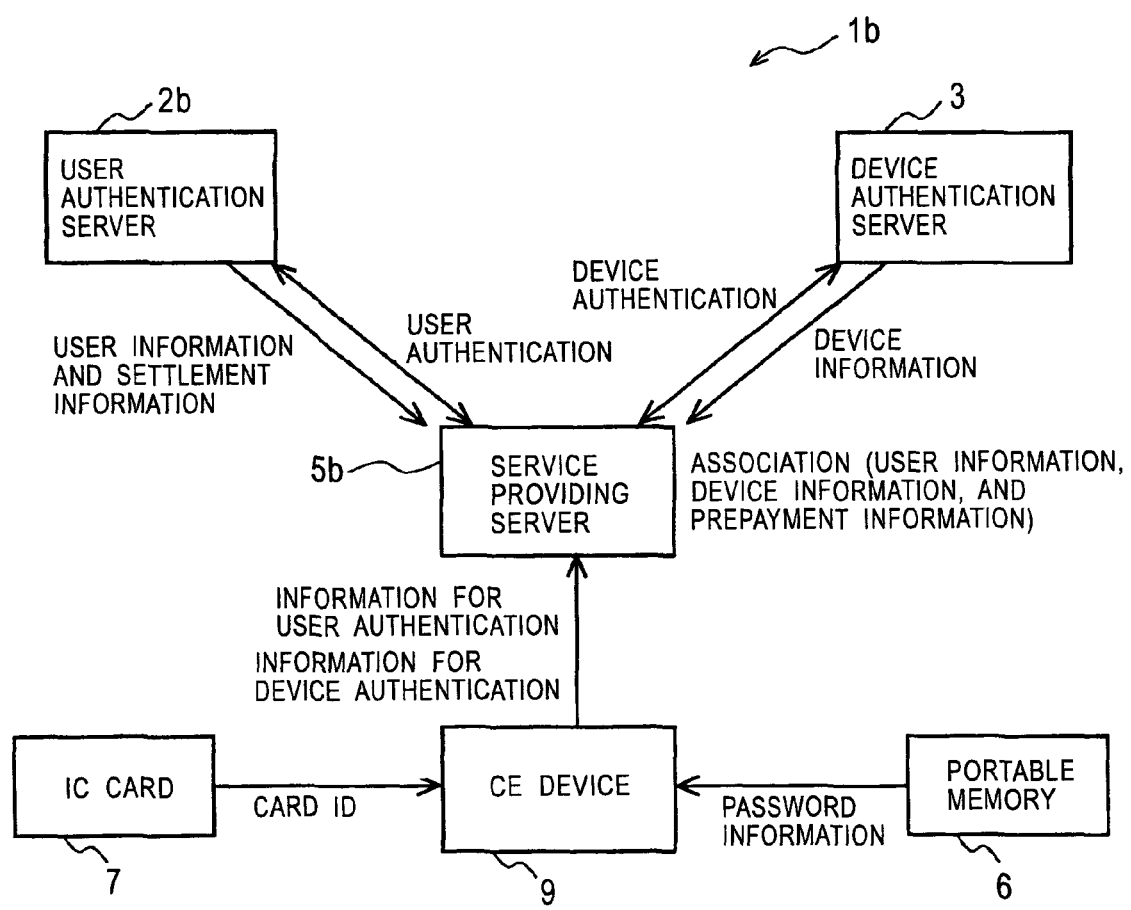
FIG. 10 is a diagram showing the configuration of a device registration system according to a third modification of the present invention.

FIG. 10 is a diagram showing the configuration of a device registration system 1*b* according to a third modification.

In this modification, a service providing server 5*b* associates a user with the CE device 9 and further with settlement information. The settlement information is information needed for settling a fee charged to the user, such as a credit card number or an account number of a bank account from which the fee is to be subtracted. The settlement information in this modification may be the prepayment information described in relation to the second modification.

Components corresponding to those in the preferred embodiment describe above are designated by the same numerals, and descriptions thereof will be omitted. Furthermore, the service providing server 5*b* uses the same procedure as in the preferred embodiment to associate user information with device information.

A user authentication server 2*b* stores settlement information of the user, and sends the settlement information to the service providing server 5*b* together with user information.

The service providing server 5*b* stores the user information and the settlement information received from the user authentication server 2*b* and device information received from the device authentication server 3 in association with each other, so that the settlement information obtained can be used for settlement.

When the user sends a request for a fee-based service from the CE device 9 to the service providing server 5*b*, the service providing server 5*b* provides the service and settles the service charge using the settlement information associated with the CE device 9.

FIG. 11A is a diagram showing an example of a user authentication table stored in the user authentication server 2*a*. As shown in FIG. 11A, in addition to the information in the user authentication table described in relation to the preferred embodiment, settlement information of the user is also associated therewith.

When sending user information to the service providing server 5*b* after user authentication, the user authentication server 2*b* also sends the settlement information.

FIG. 11B is a diagram showing an example of a service user table stored in the service providing server 5*b*.

As shown in FIG. 11B, user information, settlement information, device information, and registered services are associated with each other in the table. More specifically, the service providing server 5*b* stores user information and settlement information received from the user authentication server 2b and device information received from the device authentication server 3 such that these pieces of information are associated with each other.

Furthermore, in the third modification, services that can be used may be set for each CE device 9.

In the third modification described above, when the user uses a fee-based service of the service providing server 5b using the CE device 9, the service charge is automatically settled according to the settlement information associated with the CE device 9.

Fourth Modification

In this modification, a device that is capable of communicating with the CE device 9, such as a remote controller of the CE device 9, is registered via the CE device 9.

By executing device registration via the CE device 9, device registration is allowed even when the device itself is not capable of connecting to the device registration server 5.

As an example, a case where a remote controller of the CE device 9 is registered using the device registration system 1 will be described. It is assumed herein that the remote controller is capable of communicating with the IC card 7.

First, the CE device 9 sends a request for device registration to the device registration server 5.

Then, the IC card 7 is set to the remote controller and a password is entered from the remote controller, and the card ID and the password are sent to the CE device 9.

The subsequent processing is the same as in the case of device registration of the CE device 9, whereby the remote controller is registered in the device registration server 5.

As described above, device registration of a device that is not capable of communication via a network is allowed via the CE device 9.

Although the preferred embodiment and the modifications thereof have been described mainly in the context of device registration, the present invention may be applied, for example, to updating the registration of the CE device 9. Thus, for example, when a device is registered at a public place or the like, such as when changing the model of a cellular phone or other communication device used for services, a device can be registered and registration can be updated quickly without allowing a third party to see personal information or user authentication information being entered.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A service providing system, comprising:
   a user authentication server for receiving an integrated circuit (IC) card identification (ID) from a terminal device and for performing a user authentication operation, the card ID identifies a user of the terminal device, the terminal device obtains the IC card ID from an IC card;
   a device authentication server for receiving a device identification (ID) from the terminal device and performing a device authentication operation; and
   a service providing unit for receiving a result of a user authentication operation and a result of a device authentication operation, and providing service to the terminal device when the user authentication operation and the device authentication operation are successful,
   the user authentication server manages user information and when the user authentication operation is successful the user authentication server transmits to the service providing unit both the result of the user authentication operation and user information corresponding to the card ID,
   the device authentication server manages device information and when the device authentication operation is successful the device authentication server transmits to the service providing unit both the result of the device authentication operation and the device information,
   the service providing unit associates the user information with one or more pieces of device information and associates each piece of device information with one or more registered service information, the association is performed based on the user authentication, the user information, the device authentication, and the device information.

2. The system according to claim 1, further comprising an IC card, and wherein the ID received by the user authentication server is the ID of the IC card.

3. The system according to claim 2, wherein the card is a contact-less card.

4. The system according to claim 1, further comprising the terminal device.

5. The system according to claim 1, wherein the user authentication server is operable to receive the card ID and a user password from the terminal device.

6. A method for providing service to a terminal device, comprising the steps of:
   receiving at a user authentication server an integrated circuit (IC) card identification (ID) that is transmitted from a terminal device and performing a user authentication operation at the user authentication server, the card ID identifies a user of the terminal device, the terminal device obtains the IC card ID from an IC card;
   receiving at a device authentication server a device identification (ID) from the terminal device and performing a device authentication operation;
   receiving a result of a user authentication operation at a service providing unit; and
   providing service to the terminal device when both the user authentication operation and the device authentication operation are successful,
   the user authentication server manages user information and when the user authentication operation is successful the user authentication server transmits to the service providing unit both the result of the user authentication operation and user information corresponding to the card ID,
   the device authentication server manages device information and when the device authentication operation is successful the device authentication server transmits to the service providing unit both the result of the device authentication operation and the device information,
   the service providing unit associates the user information with one or more pieces of device information and associates each piece of device information with one or more registered service information, the association is performed based on the user authentication, the user information, the device authentication, and the device information.

7. The method according to claim 6, further comprising the step of transmitting the card ID from an IC card to the terminal device.

8. The method according to claim 7, wherein the step of transmitting comprises the step of transmitting the card ID from the IC card to the terminal device through wireless communication.

9. The method according to claim 6, wherein the step of receiving a card ID from the terminal device comprises the step of receiving a card ID and a user password from the terminal device.

10. A non-transitory computer-readable storage medium storing a computer-readable program for implementing a method for providing service to a terminal device, the method comprising the steps of:
- receiving at a user authentication server an integrated circuit (IC) card identification (ID) that is transmitted from a terminal device and performing a user authentication operation at the user authentication server, the card ID identifies a user of the terminal device, the terminal device obtains the IC card ID from an IC card;
- receiving at a device authentication server a device identification (ID) from the terminal device and performing a device authentication operation;
- receiving at a service providing unit a result of a user authentication operation; and
- providing service to the terminal device when both the user authentication operation and the device authentication operation are successful,
- the user authentication server manages user information and when the user authentication operation is successful the user authentication server transmits to the service providing unit both the result of the user authentication operation and user information corresponding to the card ID,
- the device authentication server manages device information and when the device authentication operation is successful the device authentication server transmits to the service providing unit both the result of the device authentication operation and the device information,
- the service providing unit associates the user information with one or more pieces of device information and associates each piece of device information with one or more registered service information, the association is performed based on the user authentication, the user information, the device authentication, and the device information.

11. The medium according to claim 10, wherein the method further comprises the step of transmitting the card ID from an IC card to the terminal device.

12. The medium according to claim 11, wherein the step of transmitting comprises the step of transmitting the card ID from the IC card to the terminal device through wireless communication.

13. The medium according to claim 10, wherein the step of receiving a card ID from the terminal device comprises the step of receiving a card ID and a user password from the terminal device.

\* \* \* \* \*